United States Patent Office 3,082,205
Patented Mar. 19, 1963

3,082,205
8,14-OXIDO Δ⁴-PREGNENES AND PROCESS THEREFOR
Josef Fried, New Brunswick, N.J., assignor to Olin Mathieson Chemical Corporation, New York, N.Y., a corporation of Virginia
No Drawing. Filed Sept. 4, 1956, Ser. No. 607,586
10 Claims. (Cl. 260—239.55)

This application is a continuation-in-part of my parent application Serial No. 417,489, filed March 10, 1954, now U.S. Patent No. 2,852,511.

This invention relates to the synthesis of steroids and has for its objects the provision of: (I) an advantageous process of preparing steroids of the general formula

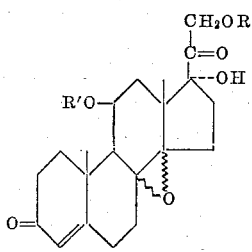

wherein R and R' are hydrogen or acyl (particularly the acyl radical of a hydrocarbon carboxylic acid having less than ten carbon atoms as exemplified by the lower fatty acids, benzoic acid, etc.) and the wavy lines connecting the epoxy radical to the nucleus of the molecule indicate that the radical can be in either the alpha or the beta position; (II) these new steroids, which are useful in themselves as physiologically active steroids; (III) an advantageous process of preparing steroids of the general formula

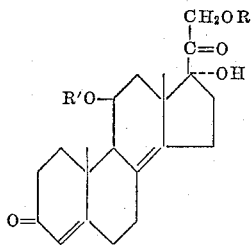

wherein R and R' are as above-defined; and (IV) these new steroids, which are useful as intermediates.

The process of this invention essentially comprises interacting Δ⁴-pregnene-9β,11β-oxido-17α,21-diol-3,20-dione or a 21-ester thereof with a strong acid (e.g., perchloric acid and hydrofluoric acid) to yield Δ⁴,⁸⁽¹⁴⁾-pregnadiene-11β,17α,21-triol-3,20-dione or a 21-ester thereof. The resultant steroid may then be esterified by reaction with an acid anhydride or acyl chloride in an organic base to yield the 21-monoester (if a free 21-ol compound is originally formed) or the 11β,21-diester. The resultant Δ⁴,⁸⁽¹⁴⁾-pregnadiene-11β,17α,21-triol-3,20-dione or an 11β- or 21-monoester or 11β,21-diester thereof is then interacted with a peracid (e.g., perphthalic acid) to form a mixture of the two epimeric 8,14-epoxides, which are then isolated from the mixture containing the same. If the free triol or an 11β- or 21-monoester thereof is employed as the starting material and a diester is desired as the final product, the initially formed 8,14-epoxide can be acylated in the usual manner, as by treatment with an acyl halide or acid anhydride in an organic base, to yield the 11β,21-diester. Conversely, if a diester is employed as the starting material and an epoxide containing free hydroxyl groups is desired, the initially formed diester can be hydrolyzed in the usual manner, as by treatment with a base such as potassium carbonate in methanol, to yield the free 11β- and/or 11β,21-dihydroxy compound.

Suitable starting materials utilizable in the first step of the process of this invention include Δ⁴-pregnene-9β,11β-oxido-17α,21-diol-3,20-dione and 21-esters thereof. Among the suitable ester derivatives may be mentioned those of hydrocarbon carboxylic acids having less than ten carbon atoms (e.g., the lower fatty acids, such as acetic and propionic acid, and benzoic acid). In accordance with this step in the process, one of these starting materials is interacted with a strong acid (e.g., perchloric acid and hydrogen fluoride) to yield, inter alia, Δ⁴,⁸⁽¹⁴⁾-pregnadiene-11β,17α,21-triol-3,20-dione or a 21-ester thereof. This reaction is preferably effected at room temperature or below, optimally in an inert organic solvent, such as glacial acetic acid or chloroform.

The Δ⁴,⁸⁽¹⁴⁾-pregnadiene-11β,17α,21-triol-3,20-dione or its 21-ester can then be converted to an 11β-ester derivative in the usual manner, as by treatment with an acyl halide or acid anhydride in a basic organic solvent, such as pyridine. The preferred acylating agents are the acyl chlorides or acid anhydrides of hydrocarbon carboxylic acids having less than ten carbon atoms as exemplified by the lower fatty acid anhydrides and benzoyl chloride.

In accordance with the next step of the process of this invention, the resultant Δ⁴,⁸,⁽¹⁴⁾-pregnadiene-11β,17α,21-triol-3,20-dione, its 21-esters, its 11β-esters, or its 11β,21-diester is interacted with a peracid, such as perphthalic acid. This reaction is preferably conducted in an organic solvent, such ether or chloroform, in the cold (i.e., at a temperature below room temperature and optimally at about 0° C.).

The 8,14-epoxides of this invention are physiologically active steroids which possess anti-inflammatory activity. Thus, these new steroids of this invention can be administered instead of, and in the same manner as, hydrocortisone, in the treatment of rheumatoid arthritis. The dosage for such administration is, of course, dependent on the relative activity of the compound.

The following examples are illustrative of the invention (all temperatures being in centigrade):

EXAMPLE 1

Δ⁴,⁸⁽¹⁴⁾-Pregnadiene-11β,17α-Triol-3,20-Dione 21-Acetate

Anhydrous hydrogen fluoride is added to a solution of 15 g. of Δ⁴-pregnene-9β,11β-oxido-17α,21-diol-3,20-dione 21-acetate in 300 ml. of chloroform (contained in a polyethylene vessel provided with a copper inlet tube). During the addition, the solution is maintained in an ice bath and agitated by magnetic stirring, until the solution assumes a prominent red color. The inlet tube is then replaced by a (polyethylene) cap, and the reaction is allowed to proceed with stirring for four and one-half hours at 0°. Concentrated aqueous sodium bicarbonate solution is then added until the mixture is slightly alkaline, and the two layers are separated. The now light-yellow chloroform solution is washed with water; and after drying over sodium sulfate, it is evaporated to dryness in vacuo. The residue (about 17.9 g.) is then taken up in 125 ml. of hot ethyl acetate, the resulting suspension filtered, and the precipitate (on the filter) treated as follows.

The ethyl acetate-insoluble material on the filter (about 1.35 g.) is recrystallized from acetone. The pure compound has the following properties: M.P. about 259–262°, with browning; $[\alpha]_D^{23}+280°$ (c., 0.53 in 95% ethanol); $\lambda_{max}^{alc.}$ 239 m$\mu$ ($\epsilon=18,000$); $\lambda_{max}^{Nujol}$ 2.94$\mu$, 3.03$\mu$, 5.75$\mu$, 5.82$\mu$, 6.07$\mu$, 6.11$\mu$

*Analysis.*—[Calculated for $C_{23}H_{30}O_6$ (402)]: C, 68.63; H, 7.51. Found (approximately). C, 68.45; H, 7.17.

EXAMPLE 2

A solution of 300 mg. of $\Delta^4$-pregnene-9$\beta$,11$\beta$-oxido-17$\alpha$,21-diol-3,20-dione 21-acetate in 30 ml. of glacial acetic acid and 0.225 ml. of 72% perchloric acid is allowed to stand at room temperature for five minutes. The reaction is stopped by the addition of dilute sodium bicarbonate and the bulk of the solvent removed in vacuo. The steroids present are extracted with chloroform, the chloroform solution washed with dilute sodium bicarbonate and water and the solvent removed in vacuo. The crystalline residue (about 340 mg.) is recrystallized from 95% ethanol. After removal of a crop of about 110 mg. of mixed crystals consisting in part of cortisone acetate, a second crop of about 41 mg. of $\Delta^{4,8(14)}$-pregnadiene - 11$\beta$,17$\alpha$,21-triol-3,20-dione 21-acetate is obtained, which upon recrystallization from the same solvent melts at about 261–263° (dec.);

$$[\alpha]_D^{23}+285°$$

(c., 0.48 in 95% ethanol). Its infrared spectrum is identical with that of an authentic sample.

EXAMPLE 3

To 10 ml. of hydrogen fluoride is added portionwise at $-70°$ over a period of five minutes, 4 g. of $\Delta^4$-pregnene-9$\beta$,11$\beta$ - oxido-17$\alpha$,21 - diol-3,20 - dione 21-acetate. The resulting deep-red solution is kept at that temperature for an additional 5 minutes and is then poured into chloroform and ice-cold sodium acetate solution. The chloroform layer is washed and evaporated to dryness in vacuo. The residue on recrystallization from acetone furnishes 1.6 g. of $\Delta^{4,8(14)}$-pregnadiene-11,17$\alpha$,21-triol-3,20-dione 21-acetate, M.P. about 246–250°;

$$[\alpha]_D^{23}+269°$$

One additional crystallization furnishes analytically pure material identical with an authentic sample.

In a similar manner, by following the procedures of Example 1 or 3 but starting with $\Delta^4$-pregnene-9$\beta$,11$\beta$-oxido-17$\alpha$,21-diol-3,20-dione, there is obtained $\Delta^{4,8(14)}$-pregnadiene-11$\beta$,17$\alpha$,21-triol-3,20-dione. If a diester of an 8,14-epoxide is desired, the 21-acetate obtained by the procedure of Examples 1, 2 or 3 can be acetylated or propionated in the 11-position by treatment with acetic or propionic anhydride in pyridine prior to its use in the next step of the process, as illustrated by the following example, or, as may fully described hereinafter, the acylation step can be deferred until the epoxide is formed.

EXAMPLE 4

*$\Delta^{4,8(14)}$-Pregnadiene-11$\beta$,17$\alpha$,21-Triol-3,20-Dione 11$\beta$-Propionate 21-Acetate*

A solution of 50 mg. of $\Delta^{4,8(14)}$-pregnadiene-11$\beta$,17$\alpha$,21-triol-3,20-dione 21-acetate in 1.0 ml. of pyridine and 0.5 ml. of propionic anhydride are allowed to stand at room temperature for 17 hours. Removal of the reagents in vacuo leaves a crystalline residue, which after recrystallization from 95% ethanol has the following properties: M.P. about 261–264°; $[\alpha]_D^{23}+260°$ (c., 0.40 in chloroform), $+243°$ (c., 0.52 in 95% ethanol);

$\lambda_{max}^{alc.}$ 238 m$\mu$ ($\epsilon=18,300$); $\lambda_{max}^{Nujol}$ 3.05$\mu$ (OH), 5.72$\mu$, 5.80$\mu$ (propionyl and acetylated side chain), 6.07$\mu$, 6.11$\mu$ ($\Delta^4$-3-ketone).

*Analysis.*—Calcd. for $C_{26}H_{34}O_7$: C, 68.10; H, 7.41. Found: C, 67.93; H, 7.36.

EXAMPLE 5

*$\Delta^4$-Pregnene-8,14-Oxido-11$\beta$,17$\alpha$,21-Triol-3,20-Dione 21-Acetate*

Titration of 40.4 mg. of $\Delta^{4,8(14)}$-pregnadiene-11$\beta$,17$\alpha$,21-triol-3,20-dione 21-acetate in 30 ml. of chloroform with 3 ml. of 0.1436 M perphthalic acid in ether at 0° shows an uptake of 1.06 mole equivalents after 17 hours. In a preparative experiment, 340 mg. of the pregnadiene in 100 ml. of chloroform and 25 ml. of ethereal perphthalic acid is stored at 0° for 16 hours. The solution is then extracted with dilute sodium bicarbonate and water, dried over sodium sulfate and the solvent removed in vacuo. The resulting reaction product (about 408 mg.) is crystallized from acetone and furnishes about 146 mg. of $\Delta^4$-pregnene-8,14-oxido-11,17$\alpha$,21-triol-3,20-dione 21-acetate (epoxide A 21-acetate), melting at about 207–208° (dec.); $[\alpha]_D^{23}+243°$ (c., 0.59 in chloroform);

$\lambda_{max}^{alc.}$ 240 m$\mu$ ($\epsilon=16,400$); $\lambda_{max}^{Nujol}$ 2.92, 3.05, 5.73, 5.80, 6.11–6.15$\mu$

*Analysis.*—Calcd. for $C_{23}H_{30}O_7$ (418.47): C, 66.01; H, 7.23. Found: C, 65.89; H, 6.90.

The mother liquors (238 mg.) obtained in the above procedure are dissolved in 4 ml. of benzene and chromatographed on alumina. Elution with chloroform-benzene (1:3, 700 ml.), (1:1, 400 ml.), and 200 ml. of chloroform furnishes about 145 mg. of the isomeric epoxide (epoxide B 21-acetate). Recrystallization from acetone-hexane gives pure material melting at about 180–182°; $[\alpha]_D^{23}+206°$ (c., 0.58 in chloroform);

$\lambda_{max}^{alc.}$ 243 m$\mu$ ($\epsilon=14,400$); $\lambda_{max}^{Nujol}$ 2.97, 3.18, 5.70, 5.77, 6.11$\mu$

*Analysis.*—Calcd. for $C_{23}H_{30}O_7$ (418.47); C, 66.01; H, 7.23. Found: C, 66.12; H, 7.01.

Epoxides A and B differ from each other by the orientation of the epoxide ring, one possessing the alpha configuration and the other the beta configuration.

EXAMPLE 6

*$\Delta^4$-Pregnene-8,14-Oxido-11$\beta$,17$\alpha$,21-Triol-3,20-Dione 11$\beta$,21-Diacetate (Epoxide A 11$\beta$,21-Diacetate)*

A solution of 50 mg. of epoxide A 21-acetate in 0.5 ml. of anhydrous pyridine and 0.5 ml. of acetic anhydride is allowed to stand at room temperature overnight. Removal of the reagents in vacuo leaves a residue, which after recrystallization from acetone-hexane melts at about 138–140°; $[\alpha]_D^{23}+252°$ (c., 0.46 in chloroform);

$\lambda_{max}^{Nujol}$ 2.89, 3.00, 3.16, 5.73, 5.81, 5.87, 6.07, 6.16$\mu$

*Analysis.*—Calcd. for $C_{25}H_{32}O_8 \cdot H_2O$ (478.52); C, 62.75; H, 7.16. Found: C, 62.97; H, 6.95.

EXAMPLE 7

Following the procedure of Example 6, but substituting an equal amount of epoxide B 21-acetate for the epoxide A 21-acetate, there is obtained epoxide B 11,21-diacetate, which melts at about 203–205°; $[\alpha]_D^{23}+207°$ (c., 0.52 in chloroform);

$\lambda_{max}^{alc.}$ 242 m$\mu$ ($\epsilon=16,600$); $\lambda_{max}^{Nujol}$ 3.06, 5.85, 5.73, 5.80, 5.92, 6.01, 6.18$\mu$

*Analysis.*—Calcd. for $C_{25}H_{32}O_8$ (460.51): C, 65.20; H, 7.00. Found: C, 65.71; H, 7.26.

Similarly, if other acylating agents are substituted for the acetic anhydride in the procedures of Example 6 or 7, the corresponding 11-ester derivative is formed. Thus, propionic anhydride yields an 11-propionate and benzoyl chloride yields an 11-benzoate.

The invention may be otherwise variously embodied with the scope of the appended claims.

I claim:
1. A compound of the general formula

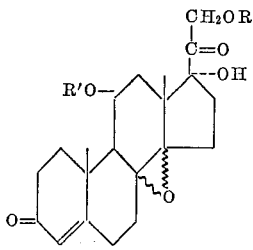

wherein R and R' are selected from the group consisting of hydrogen and the acyl radical of a hydrocarbon carboxylic acid having less than ten carbon atoms.

2. $\Delta^4$-pregnene-8,14-oxido-11$\beta$,17$\alpha$,21-triol-3,20 - dione 21-acetate.

3. $\Delta^4$-pregnene-8,14-oxido-11$\beta$,17$\alpha$,21-triol-3,20 - dione 11$\beta$,21-diacetate.

4. A process for preparing the compound of claim 1, which comprises interacting a steroid of the general formula

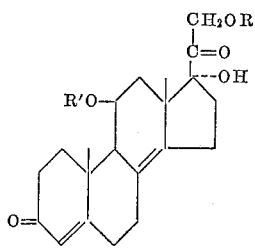

wherein R and R' are selected from the group consisting of hydrogen and the acyl radical of a hydrocarbon carboxylic acid having less than ten carbon atoms, with a peracid.

5. The process of claim 4, wherein the peracid is perphthalic acid, and the reaction is conducted in the cold.

6. The process of claim 5, wherein the steroid reactant is $\Delta^{4,8(14)}$-pregnadiene-11$\beta$,17$\alpha$,21-triol-3,20-dione 21-acetate.

7. A process for preparing a compound of the general formula

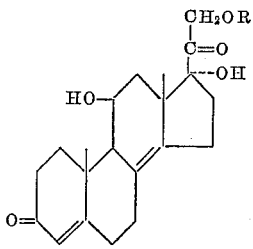

wherein R is selected from the group consisting of hydrogen and the acyl radical of a hydrocarbon carboxylic acid having less than ten carbon atoms, which comprises interacting a steroid of the general formula

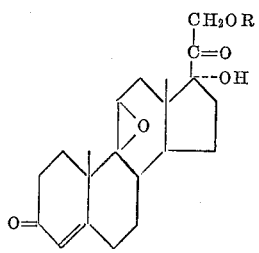

with a strong acid and recovering the $\Delta^{8(14)}$-steroid formed.

8. The process of claim 7, wherein the steroid reactant is $\Delta^4$-pregnene-9$\beta$,11$\beta$-oxido-17$\alpha$,21-diol-3,20 - dione 21-acetate.

9. The process of claim 8, wherein the strong acid is hydrofluoric acid.

10. A process for preparing a compound of the general formula

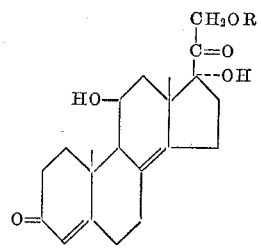

wherein R is selected from the group consisting of hydrogen and the acyl radical of a hydrocarbon carboxylic acid having less than ten carbon atoms, which comprises interacting a steroid of the general formula

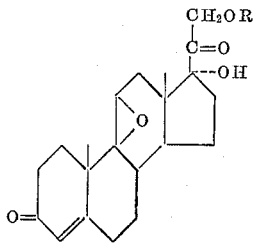

with perchloric acid, and recovering the $\Delta^{8(14)}$-steroid formed.

References Cited in the file of this patent
UNITED STATES PATENTS

| | | |
|---|---|---|
| 2,606,914 | Bernstein | Aug. 12, 1952 |
| 2,756,179 | Fried | July 24, 1956 |
| 2,763,671 | Fried | Sept. 18, 1956 |
| 2,813,882 | Sarett | Nov. 19, 1957 |